UNITED STATES PATENT OFFICE.

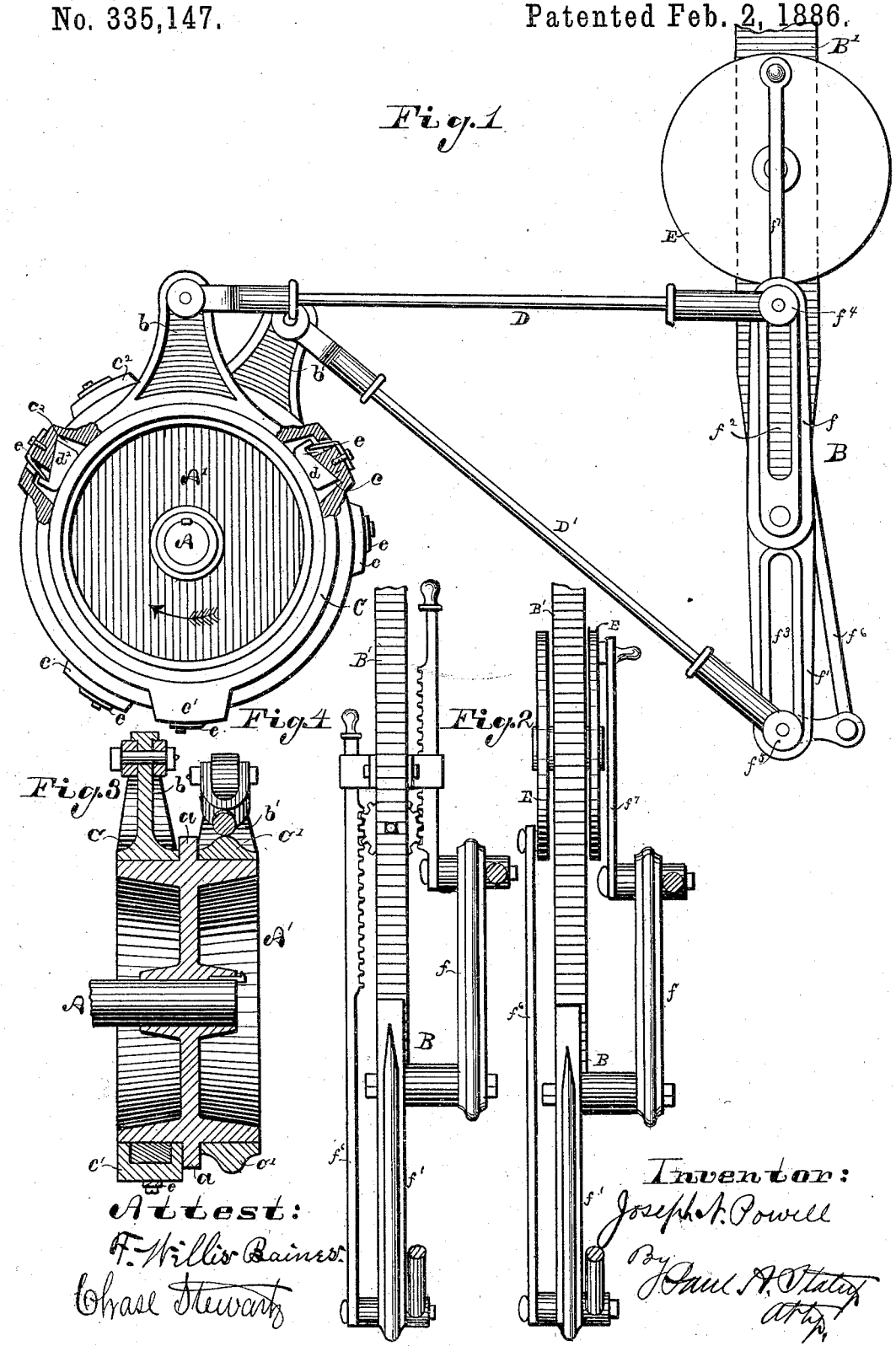

JOSEPH N. POWELL, OF SPRINGFIELD, OHIO.

DEVICE FOR CONVERTING MOTION.

SPECIFICATION forming part of Letters Patent No. 335,147, dated February 2, 1886.

Application filed December 8, 1885. Serial No. 185,064. (No model.)

*To all whom it may concern:*

Be it known that I, JOSEPH N. POWELL, a citizen of the United States, residing at Springfield, in the county of Clark and State of Ohio, have invented certain new and useful Improvements in Devices for Converting Motion, of which the following is a specification.

My invention relates to improvements in devices for converting a reciprocating into a rotary motion; and the objects of my invention are, first, to provide a device of simple construction embodying a novel clutch mechanism and connections, whereby a continuous revolving motion is obtained in a constant direction from an oscillating or reciprocating motion; second, to provide novel means for uniformly varying the speed of the rotating mechanism.

My invention consists in the combinations and constructions of parts hereinafter described, and pointed out in the claims.

In the accompanying drawings, Figure 1 is a side elevation view of a device embodying my invention, the clutch mechanism being shown partly in section. Fig. 2 is a front elevation view of the oscillating lever, showing the manner of attaching the connecting-arms so as to be variable. Fig. 3 is a vertical sectional view of the clutch-wheel, and Fig. 4 is a view showing a modification of the lever and connections.

Like parts are indicated by similar letters of reference throughout the several views.

In the said drawings, A is a revolving shaft, and B is a vibrating or reciprocating lever. Rigidly secured to the shaft A is a clutch-wheel, A', the periphery of which is divided into two parts, which are separated by a flange or collar, $a$, thereon. On either side of the collar $a$, encircling the wheel A', are two clutch rings or bands, C C', which are respectively supplied on one side with projecting ears or lugs $b\ b'$. Each of the clutch-bands C C' is provided with clutch-cases $c\ c'\ c^2$, in which are located clutches $d\ d'\ d^2$. Three of these clutches are preferably used. These clutches rest on one side directly against the periphery of the wheel A', and on the other side against the top of the clutch-cases, which are formed wedge-shaped or in the form of an inclined plane, the tops of the clutches being similarly formed.

Each of the clutches is preferably provided with a spring, $e$, which is secured to the clutch-band and tends to draw the clutch longitudinally along the inclined plane, and thus force the clutch against the periphery of the wheel. It will be seen, now, that as the bands C C' are moved in one direction the friction of the clutches against the periphery of the wheel will cause the clutches to move away from the inclined plane, and thus loosen the clutches; but when turned in the opposite way the clutches will be drawn toward the incline, and thus forced against the periphery of the wheel, causing it to turn with the said bands. The clutches, being three in number, are distributed evenly around the circumference of the bands C C', and are adapted to be moved uniformly against the wheel A'. The said wheel is thus engaged equally at three points, so that no lateral strain is occasioned on the wheel or its bearings.

Attached to the lugs or ears $b\ b'$ of the respective bands C C' are connecting-rods D D', which are attached at their other ends to the vibrating lever B, the said rods being connected to said lever at opposite sides of the center of oscillation and at equal distances therefrom.

It will be seen that as the lever B is moved in either direction one of the connecting-rods will be drawn back and the other pushed forward, thus moving the clutch-rings C C' in opposite directions about the wheel A'. As the clutch-rings are respectively drawn forward, the clutches therein engage with the wheel A' and turn the same in the direction of the arrow in Fig. 1. As each ring is turned backward, the clutches are loosened and the said ring turns freely on the wheel A'. A continuous revolving motion is thus imparted to the shaft A from the reciprocating motion of the lever B.

In order that the relative speed of the shaft A and the lever B may be varied, so that the shaft may be revolved faster or slower, in proportion to the speed of the handle or lever B, and thus increase or diminish the power of the device, I provide means for shortening the stroke of the respective connecting-rods D D', the stroke of each rod being changed equally, so that the power of each shall be the same. I accomplish this by connecting the said rods to movable wrist-pins on the lever B, and providing mechanism adapted to move said wrist-pins uniformly to or from the center of oscillation of said lever.

The lever is preferably made in two parts, $f$ and $f'$, one of which stands back of the other. Each of these parts is provided with a longitudinal slot, $f^2$ and $f^3$, in which the wrist-pins $f^4 f^5$ are adapted to slide. On the upper part of the handle or lever proper, B', is a crank-wheel, E, journaled in a bearing in said lever or handle, and provided with two crank-pins on opposite sides thereof, to which the respective wrist-pins $f^4 f^5$ are attached by pitman-connections $f^6 f^7$.

As the crank-wheel is revolved in either direction, one of the wrist-pins will be lowered and the other correspondingly raised, thus moving both the said pins equally to or from the center of oscillation of the lever.

I have shown in the drawings two crank-wheels secured on a shaft, which extends through the lever, one of the pitmen being connected to each of the said wheels. It is obvious, however, that both pitmen may be connected on opposite sides of a single crank-wheel with good results. The lever may also be variously modified. In Fig. 4 I have shown a modification in which the pitmen are each provided with a rack adapted to engage on opposite sides of a pinion journaled in the lever. By pushing down on one rack the other will be correspondingly raised, thus changing the positions of the wrist-pins uniformly on each side of the center of oscillation.

I am aware that slotted levers or cranks have been used in connection with movable wrist-pins. I do not, therefore, claim this feature, broadly, but claim as my invention—

1. The combination, with a reciprocating lever, of a friction-wheel having two independent clutch-rings thereon, each of said clutch-rings being provided with a series of clutches around the face of said wheel, and means for connecting said clutch-rings to said lever, so that a motion of the lever in either direction will produce a backward motion of one ring and a forward motion of the other, substantially as set forth.

2. The combination, with a revolving wheel, of clutching devices on said wheel, said clutching devices being respectively connected by suitable means to a lever on either side of the center thereof, and means for uniformly varying the respective points at which the connections are made to said lever to or from the center of oscillation thereof, substantially as specified.

3. The combination, with a revolving wheel, of two independent clutch-rings journaled on said wheel, each of said clutch-rings being provided with three or more wedge-shaped clutches adapted to engage the periphery of the said wheel when moved in a forward direction, and means for alternately moving said clutch-rings simultaneously in opposite directions, substantially as and for the purpose set forth.

4. The combination, with the clutch-rings journaled on the revolving wheel, and provided with wedge-shaped clutches adapted to engage the periphery of the said wheel when the clutch-ring is moved in a forward direction, of a lever provided with slotted openings on each side of its center of oscillation, wrist-pins in said slotted openings, connecting-rods from said wrist-pins to the said clutch-rings, respectively, a crank-wheel on said lever, and pitman-connections from said wrist-pins to opposite sides of said crank-wheel, substantially as specified.

In testimony whereof I have hereunto set my hand this 28th day of November, A. D. 1885.

JOSEPH N. POWELL.

Witnesses:
PAUL A. STALEY,
CHASE STEWART.